(12) United States Patent
Harvey et al.

(10) Patent No.: US 8,611,813 B1
(45) Date of Patent: Dec. 17, 2013

(54) UTILIZING A MOBILE DEVICE TO CONTROL OPERATION OF A REPEATER

(75) Inventors: Richard Lee Harvey, Branchburg, NJ (US); John Frank Pawlik, Chicago, IL (US); Michael Anthony Centore, III, Dunellen, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 213 days.

(21) Appl. No.: 13/189,051

(22) Filed: Jul. 22, 2011

(51) Int. Cl.
*H04B 7/185* (2006.01)

(52) U.S. Cl.
USPC ......... 455/13.1; 455/11.1; 370/274; 370/279; 370/315; 370/492

(58) Field of Classification Search
USPC ............... 455/3.02, 427, 428, 430, 431, 7–9, 455/11.1, 12.1, 13.1, 13.2, 14–17; 340/425.1; 370/226, 293, 246, 274, 370/279, 315, 316, 492, 501
See application file for complete search history.

(56) References Cited

U.S. PATENT DOCUMENTS

| | | | | |
|---|---|---|---|---|
| 6,718,158 B1* | 4/2004 | Suonvieri | ............... | 455/9 |
| 6,768,897 B1* | 7/2004 | Suonvieri | ............... | 455/15 |
| 8,284,709 B2* | 10/2012 | Youn et al. | ............... | 370/315 |
| 8,307,200 B2* | 11/2012 | Tanizawa et al. | ............... | 713/152 |
| 2002/0028655 A1* | 3/2002 | Rosener et al. | ............... | 455/16 |
| 2003/0125067 A1* | 7/2003 | Takeda et al. | ............... | 455/522 |
| 2004/0090312 A1* | 5/2004 | Manis et al. | ............... | 340/310.02 |
| 2005/0169206 A1* | 8/2005 | Nozaki | ............... | 370/316 |
| 2007/0129085 A1* | 6/2007 | Kennedy, Jr. | ............... | 455/456.2 |
| 2007/0208810 A1* | 9/2007 | Mostafa | ............... | 709/206 |
| 2008/0097851 A1* | 4/2008 | Bemmel et al. | ............... | 705/14 |
| 2009/0047898 A1* | 2/2009 | Imamura et al. | ............... | 455/7 |
| 2009/0135933 A1* | 5/2009 | Miyoshi | ............... | 375/260 |
| 2009/0168736 A1* | 7/2009 | Itagaki et al. | ............... | 370/338 |
| 2009/0176498 A1* | 7/2009 | Colon | ............... | 455/445 |
| 2009/0239466 A1* | 9/2009 | Saitou et al. | ............... | 455/11.1 |
| 2010/0128622 A1* | 5/2010 | Horiuchi et al. | ............... | 370/252 |
| 2010/0202343 A1* | 8/2010 | Hunzinger et al. | ............... | 370/315 |
| 2010/0230247 A1* | 9/2010 | McKee | ............... | 198/804 |
| 2010/0304665 A1* | 12/2010 | Higuchi | ............... | 455/7 |
| 2011/0019608 A1* | 1/2011 | Dohler et al. | ............... | 370/315 |
| 2011/0134827 A1* | 6/2011 | Hooli et al. | ............... | 370/315 |
| 2011/0205110 A1* | 8/2011 | Abraham et al. | ............... | 342/357.42 |
| 2011/0249558 A1* | 10/2011 | Raaf et al. | ............... | 370/237 |
| 2012/0176958 A1* | 7/2012 | Queseth et al. | ............... | 370/315 |
| 2012/0218934 A1* | 8/2012 | Takehana et al. | ............... | 370/315 |
| 2012/0230244 A1* | 9/2012 | Bienas et al. | ............... | 370/315 |
| 2013/0040558 A1* | 2/2013 | Kazmi | ............... | 455/9 |

* cited by examiner

*Primary Examiner* — Dominic E Rego

(57) ABSTRACT

The instant application describes a method that includes steps of receiving, at a mobile device, an identification signal from a repeater informing the mobile device of a presence of the repeater within a proximity of the mobile device and sending, from the mobile device, an inquiry request to the repeater requesting information associated with capabilities of the repeater identified in the identification signal. The method also includes steps of receiving, at the mobile device, the requested information from the repeater; determining, based on the received information, whether to use the repeater for communication between the mobile device and a mobile communication network; and controlling the repeater based on the determination result.

22 Claims, 8 Drawing Sheets

UTILIZING A MOBILE DEVICE TO CONTROL OPERATION OF A REPEATER

TECHNICAL FIELD

The present subject matter relates to systems and methods for controlling operation of a repeater using a mobile device of a subscriber.

BACKGROUND

Repeaters or bi-directional amplifiers are frequently used to bring Radio Frequency (RF) energy into areas where subscribers lack coverage ubiquity or capacity sufficiency such as, for example, inside the buildings (e.g., offices, retail stores, etc.) or inside vehicles (e.g., trains, cars, etc.). Repeaters may be fixed or mobile and include multiple antennas—one pointing to the cell site and another pointing to the mobile device. For example, a repeater included in a car includes a single donor antenna outside of the car (e.g., on the roof of the car) and a single coverage antenna inside of the car.

In a simple configuration with a single donor antenna and a single coverage antenna, the repeater is used to augment voice and data service by capturing the RF energy from the network and passing it to the mobile device. Repeaters today are not under the control of consumer's mobile device. Repeaters are always ON and do not know what spectrum they are being used to amplify. Since the repeaters are always ON, they are ON even when not needed. For example, the repeater should not be active if it only supports frequency bands and/or radio technologies different from the mobile device that is in the area which the repeater is serving. Therefore, having such a repeater ON does not enhance mobile device operation and may be detrimental to the mobile device and/or wireless network by, for example, causing problems such as interference, noise, or poor performance.

Therefore, there is a need for a system and a method that allows for control of the repeaters by the consumer's mobile device.

SUMMARY

The instant application, in one aspect, describes Bluetooth or other control of a repeater by a supported mobile device. When a repeater is controlled by a supported wireless device the following functions/features are supported: (i) the repeater and the wireless device information exchange; (ii) as a result of the information exchange, the repeater registers with the wireless device and optionally registers with the wireless network through the wireless device; (iii) the wireless device determines whether the repeater can support spectrum and technology supported by the wireless device; (iv) the wireless device requests the repeater turn ON and OFF; and (v) the wireless device provides information to the repeater to change spectrum blocks/bands as needed to follow handoff between cells or spectrum bands.

In one general aspect, the instant application describes a method that includes steps of: receiving, at a mobile device, an identification signal from a repeater informing the mobile device of a presence of the repeater within a proximity of the mobile device; and sending, from the mobile device, an inquiry request to the repeater requesting information associated with capabilities of the repeater identified in the identification signal. The method further includes steps of: receiving, at the mobile device, the requested information from the repeater; determining, based on the received information, whether to use the repeater for communication between the mobile device and a mobile communication network; and controlling, by the mobile device, the repeater based on the determination result.

The above general aspect may include one or more of the following features. The method may further include steps of: establishing a first communication link between the mobile device and the repeater for controlling the repeater; and after establishing the first communication link, establishing a second communication link between the mobile device and the repeater for communication between the mobile device and the mobile communication network via the repeater, the first and second communication links using different technologies. The first communication link may include a Bluetooth communication link, and the second communication link may include a cellular communication link.

The information associated with the capabilities of the repeater may include a radio band and a radio technology supported by the repeater. Determining whether to use the repeater may include determining, at the mobile device, whether the radio band and the radio technology supported by the repeater are compatible with a radio band and a radio technology supported by the mobile device. Determining whether to use the repeater may include determining, at the mobile device, whether the mobile device is receiving a signal of sufficient signal level or quality from the mobile communication network without use of the repeater, and controlling the repeater may include instructing the repeater to turn ON upon determining that the mobile device is not receiving a signal of sufficient signal level or quality from the mobile communication network.

Determining whether to use the repeater may include determining, at the mobile device, whether use of the repeater for communications between the mobile device and the mobile communication network would significantly detrimentally affect operation of a nearby base station other than a base station serving the mobile device. The method may further include a step of determining a signal level of the nearby base station. Determining whether use of the repeater would significantly detrimentally affect operation of the nearby base station may be based on the signal level.

The method may further include steps of: establishing communication with the mobile communication network; sending the identification signal to the mobile communication network; and receiving instructions from the mobile communication network as to allow or prohibit the use of the repeater based on the forwarded identification signal. Controlling the repeater may include controlling the repeater based on the received instructions from the mobile communication network.

Controlling the repeater may include instructing the repeater to turn ON and to amplify only spectrum band/block in which the mobile device operates from among a plurality of spectrum bands/blocks supported by the repeater. Controlling the repeater may include turning ON the repeater, which was OFF, upon determining that the repeater should be used for communication between the mobile device and the mobile communication network.

The method may further include steps of: determining that the mobile device has changed a spectrum band/block of operation; and upon determining that the mobile device has changed the spectrum band/block of operation, determining whether the changed spectrum band/block is compatible with one of a plurality spectrum bands/blocks supported by the repeater. Controlling the repeater may further include turning OFF the repeater, after previously having turned ON the repeater, upon determining that the changed spectrum band/block is not compatible with the spectrum bands/blocks supported by the repeater.

The method may further include steps of: determining that the mobile device has changed a spectrum band/block of operation; and upon determining that the mobile device has changed the spectrum band/block of operation, determining whether the changed spectrum band/block is compatible with one of a plurality spectrum bands/blocks supported by the repeater. Controlling the repeater may further include instructing the repeater to not amplify previously amplified spectrum band/block, to tune into the changed spectrum band/block, and to amplify the changed spectrum band/block upon determining that the changed spectrum band/block is compatible with one of the plurality of spectrum bands/blocks supported by the repeater. Controlling the repeater may include turning OFF the repeater, which was ON, upon determining that the repeater should not be used for communication between the mobile device and the mobile communication network.

The method may further include steps of: requesting authorization from a user of the mobile device to use the repeater for communication between the mobile device and the mobile communication network. Controlling the repeater may include instructing the repeater to turn ON after receiving authorization from the user to use the repeater for communication between the mobile device and the mobile communication network.

Implementations of the described techniques may include hardware, a method or process, software for a mobile device on a computer-accessible medium.

The details of one or more implementations are set forth in the accompanying drawings and the description below. Other features will be apparent from the description and drawings, and from the claims.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
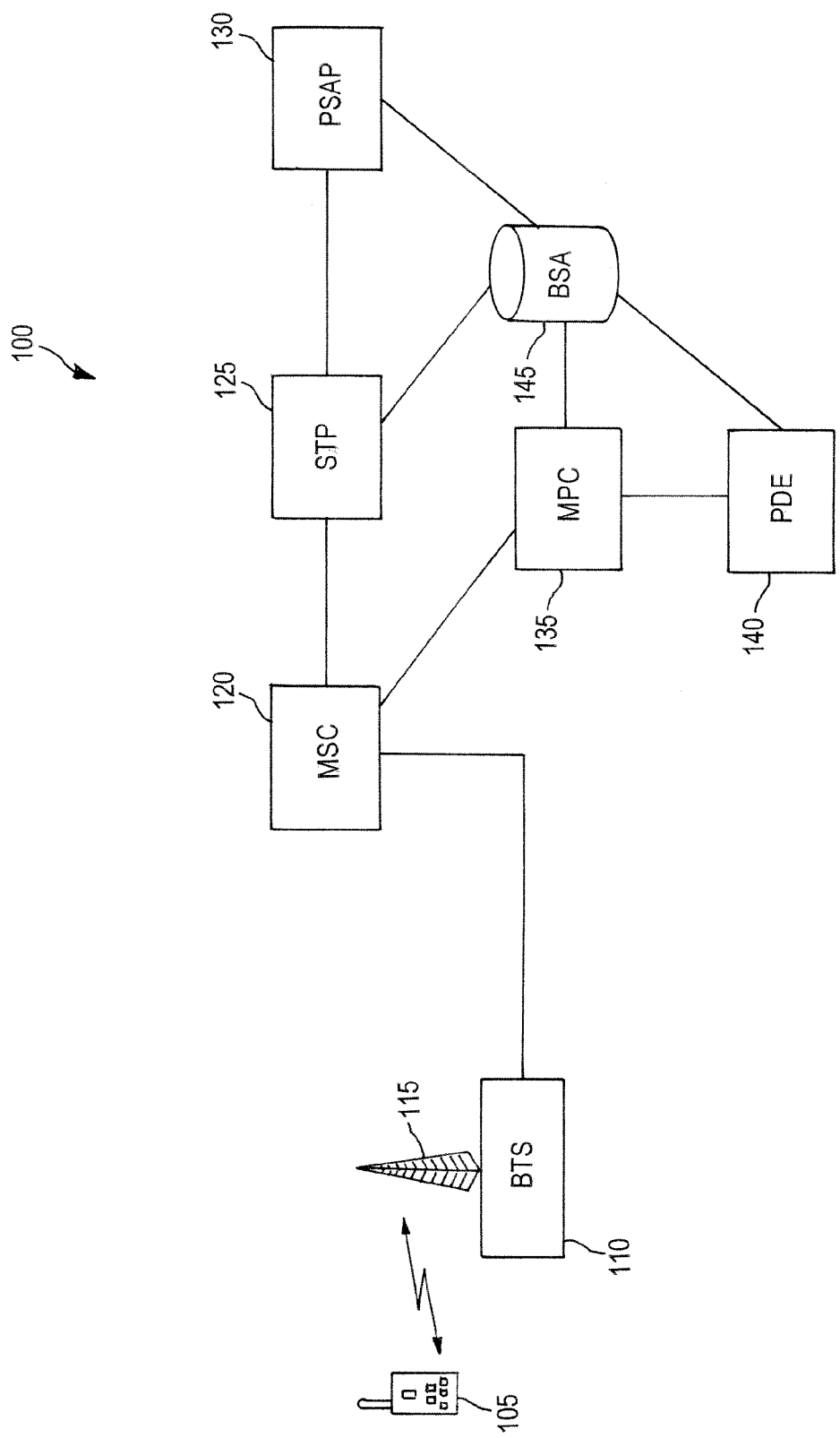
FIG. 1 illustrates an exemplary mobile communication network.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

This disclosure describes systems and methods that allow a repeater to be directly controlled by an individual mobile device. The mobile device can enable or disable the repeater via commands generated by the mobile device. The mobile device can also enable or disable the repeater via commands generated by the mobile communication network operator. The repeater can be fixed or mobile. The repeater may be under the control of the consumer's mobile phone or another wireless device. If there is no wireless device present for controlling the repeater, a default setting is implemented in the repeater. The default setting includes maintaining the repeater in the OFF state (e.g., disabling the amplification functionality of the repeater). Even though the repeater is OFF, the repeater still transmits identification signal for establishing a control link between the repeater and the wireless device once the wireless device comes within the communication range of the repeater. The control link may be wired or wireless. In one specific example, the wireless link includes Bluetooth connectivity. However, other types of short-range wireless connectivity are also possible such as, for example, Wi-Fi and Infrared.

In keeping with the previous example, the repeater includes a Bluetooth radio link that connects to the mobile device. The power of the Bluetooth transmitter is limited to ensure the mobile device is located nearby the repeater. Once the mobile device is located within the Bluetooth connectivity range of the repeater, the repeater identifies itself to the mobile device and pairs with the mobile device using a Bluetooth technology. Bluetooth technology is a packet-based protocol with a master-slave structure, which is well known in the art and is not described here in more detail for the sake of brevity. Once the repeater and the mobile device are paired, the mobile device determines whether the repeater is needed. If so, the mobile device turns on the repeater and sets the repeater to use the correct spectrum blocks for amplification.

The mobile device discovers the make, model, frequency bands, radio technologies supported by the repeater by the Bluetooth inquiry. The mobile device utilizes this information to determine whether use of the repeater is able to increase the signal level or quality for successful call or data session. Based on the determination result, the mobile device controls the operation of the repeater. Specifically, the mobile device determines whether a radio band and a radio technology supported by the mobile device is compatible with one of the plurality of radio bands and radio technologies supported by the repeater. If so, the mobile device activates (turns ON) the repeater if the repeater is deactivated. The mobile device may also instruct the repeater to tune into the radio band supported by the mobile device from among the plurality of radio bands supported by the repeater if this functionality is available on the repeater. If, however, the radio bands and/or the radio technologies supported by the repeater are not compatible with the radio band and/or the radio technology supported by the mobile device, the mobile device deactivates the repeater (if the repeater is activated).

FIG. 1 illustrates an exemplary mobile communication network 100. The network 100 includes a mobile device 105, a Base Transceiver System ("BTS") 110, an antenna 115, a Mobile Switching Center ("MSC") 120, a Signal Transfer Point ("STP") 125, a Mobile Positioning Center ("MPC") 135, a Position Determination Entity ("PDE") 140, and a Base Station Almanac Database ("BSA") 145. In practice, there may be any number of other network elements that are not shown and described in this disclosure. For example, the single mobile device 105, single BTS 110 and single antenna 115 are merely shown for illustrations and their number are not meant to be limiting. Indeed, network 100 provides mobile communications for numerous other mobile devices though numerous other base stations.

The network 100 offers many services such as, for example, packet data services and mobile voice telephone services. The mobile device 105 represents a general class of mobile devices that operate via public cellular networks or the like. To this end, mobile device 105 includes hardware and software that enables it to act as a mobile phone. The mobile device 105 may be, for example, a wireless phone, a personal digital assistant, a portable e-mail device (e.g., a Blackberry®), a pager, or other electronic devices capable of communicating over network 100.

The BTS 110 serves as a hub for radio communications and supports sub-layers of an air-link protocol carried for transmitting and/or receiving data packets to and/or from mobile device 105. The BTS 110 uses one of several mobile access technologies for allowing mobile device 105 to connect to MSC 120. For example, BTS 110 uses access technologies such as global system for mobile communications ("GSM"), general packet radio service ("GPRS"), code division multiple access ("CDMA"), ultra mobile broadband ("UMB"), long term evolution ("LTE"), and/or WiMax. The BTS 110, however, is not limited to these technologies and may use other technologies.

Regardless of the type of technology used by BTS 110, it is configured to allow any compatible mobile device 105 to connect to MSC 120. To this end, using its antenna 115, BTS 110 communicates with mobile device 105. The antenna 115 serves a subset of the overall geography covered by network 100. For example, in FIG. 1, antenna 115 covers mobile device 105 in one region or "cell" of network 100, whereas other antennas cover mobile devices 105 in other regions or "cells" of network 100.

The BTS 110 is configured to assign and reassign channels to mobile device 105 and to monitor the signal levels to recommend hand-offs to other base stations. In a typical current example, there are four channels. Three of the channels are for overhead, and one of the channels carries traffic (e.g., either data or voice). Of the three channels that are used for overhead, the simplest channel is called a pilot channel. The pilot channel is a downlink channel that mobile device 105 uses to acquire the network's time base, so other more complex control or traffic channel information can be exchanged between BTS 110 and the mobile device 105. In one implementation, information about pilot signals received by mobile device 105 is returned to BTS 110 and used to facilitate handoff between sectors as well as position determination.

The network 100 also typically includes a Base Station Controller ("BSC") functionality (not shown) that controls the functions of a number of base stations and helps to manage how calls made by each mobile device are transferred (or "handed-off") from one serving BTS to another. Each wireless network equipment vender implements this function differently. Some vendors have a physical entity, which they call a BSC, while other vendors include this functionality as part of their MSC 120.

The MSC 120 supports both cellular voice and packet data services. As shown, MSC 120 connects through trunk circuits to the BTS 110 that MSC 120 serves and controls. The MSC 120 provides voice service switching for calls between mobile devices via interconnecting trunks and to other devices via the PSTN network (not shown) (e.g., for calls to and from landline telephones). Additionally, MSC 120 also provides voice service switching via trunks to one or more MSCs in other carrier's wireless network for communications with other mobile device currently operating through other networks. Although not shown, connections also are provided to other networks, such as the public switched telephone network and the Internet.

The network 100 also includes one or more STP 125, typically deployed as mated pairs of STPs, coupled to MSC 120 and to elements of the PSTN through signaling system number 7 ("SS7") link sets. The STPs and the links thereto provide a signaling network, for use in managing call traffic. The network 100 enables communication with a Public-Safety Answering Point ("PSAP") 130.

The PSAP 130 is a server responsible for handling emergency calls such as calls for police, ambulance and firefighter services. A PSAP normally receives voice telephone calls. Most PSAPs are capable of locating callers using landline phones and many can handle mobile phones if the mobile service provides for such capability. For location based services, including mobile device 105 location during an emergency call, network 100 also includes MPC 135 and PDE 140. In assisted GPS (global positioning system) type deployments, for example, PDE 140 provides data to mobile device 105 to expedite satellite acquisition; and it may determine the actual latitude and longitude (final fix) of mobile device 105 based on GPS measurements taken by mobile device 105 at the PDE's request.

To identify a location fix on mobile device 105, PDE 140 references database 145. The network elements that can be used for location determination are identified in database 145. When mobile device 105 detects a pilot signal during a location assessment attempt, mobile device 105 reports the pilot signal that it hears. This information is sent to the network and routed to PDE 140. In this manner, mobile device 105 identifies to PDE 140, the base station sector that is serving mobile device 105. Mobile device 105 may also identify to PDE 140 one or more other base station sector via the pilots that it hears from those sectors (for sectors nearby but not currently servicing mobile device 105). The PDE 140 references database 145 to determine the appropriate properties of those BTSs that can be heard and, with the determined information, makes its calculation for location of the mobile device as best as it can since solution other than 100% GPS solution are susceptible to error due. In one implementation, database 145 includes for each pilot signal a sector identification label, a coordinate pair associated with the source of the pilot signal, and/or a Maximum Antenna Range (MAR) value field that defines a reasonable boundary for the coverage footprint of the source of the pilot beacon signal.

As noted above, antenna 115 covers mobile device 105 in one region or "cell" of network 100, whereas other antennas cover mobile devices 105 in other regions or "cells" of network 100. The mobile device 105 at times may be located in a building or the like where the subscriber does not receive sufficient coverage from the "cells" of network 100. For example, the subscriber may not receive sufficient coverage at his/her home. To this end, the subscriber may utilize a repeater to extend the coverage of network 100 to his/her home. Repeaters or bi-directional amplifiers are frequently used to bring RF energy into a building or the like where subscribers lack coverage ubiquity or sufficient capacity.

Figure 2:
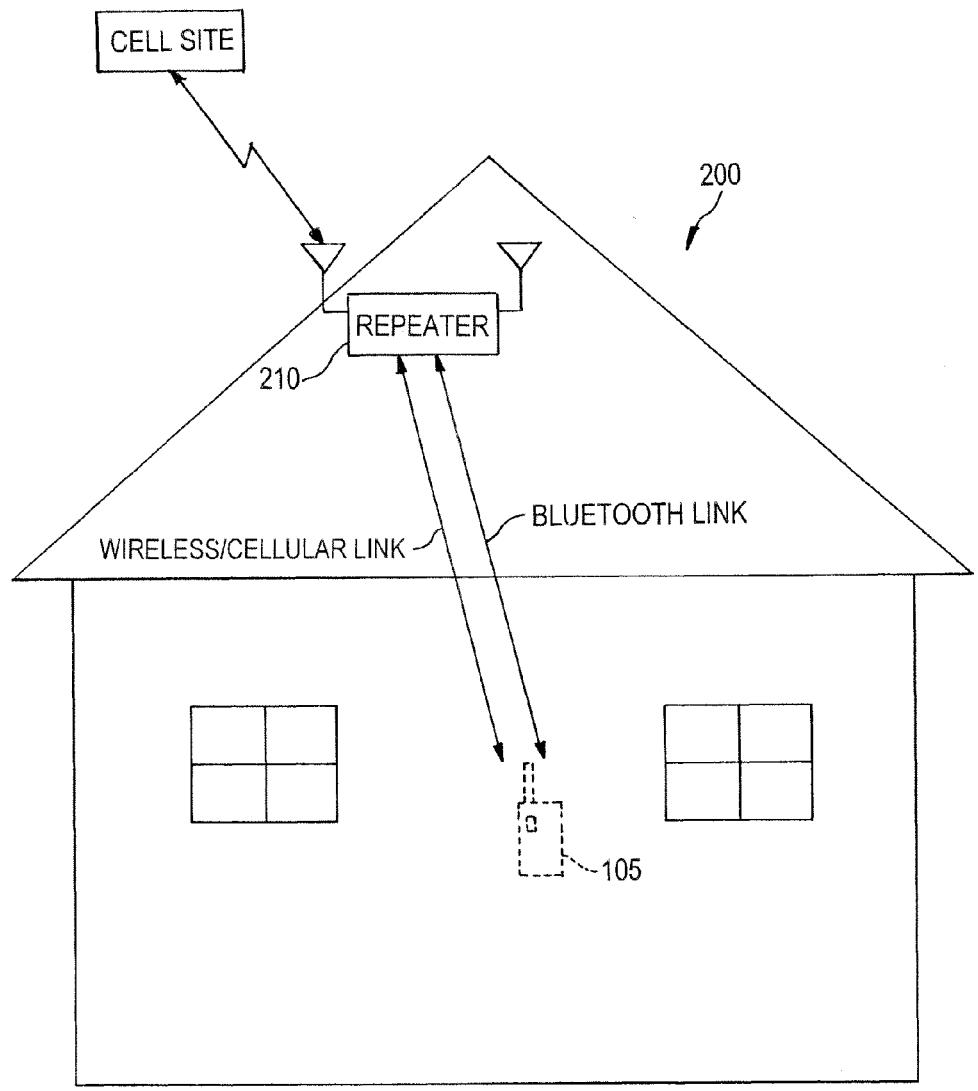
FIG. 2 illustrates an exemplary building including a repeater and/or antenna shown in the network of FIG. 1.

FIG. 2 illustrates an exemplary building 200 including a repeater and antenna 210. The repeater 210 is configured to receive the signal from outside of the building and retransmit the signal at a higher power within the building. In one implementation, building 200 is part of the network 100 shown in FIG. 1. That is, FIG. 2 illustrates a scenario in which mobile device 105 is located within building 200. For sake of brevity, however, other components of network 100 are not shown in FIG. 2. As shown, two links exists between the repeater 210 and mobile device 105. The first link is a wireless/cellular link and the second link is the Bluetooth link. In keeping with the previous example, the Bluetooth link is used by the mobile device 105 to control the operation of the repeater 210.

Figure 3:
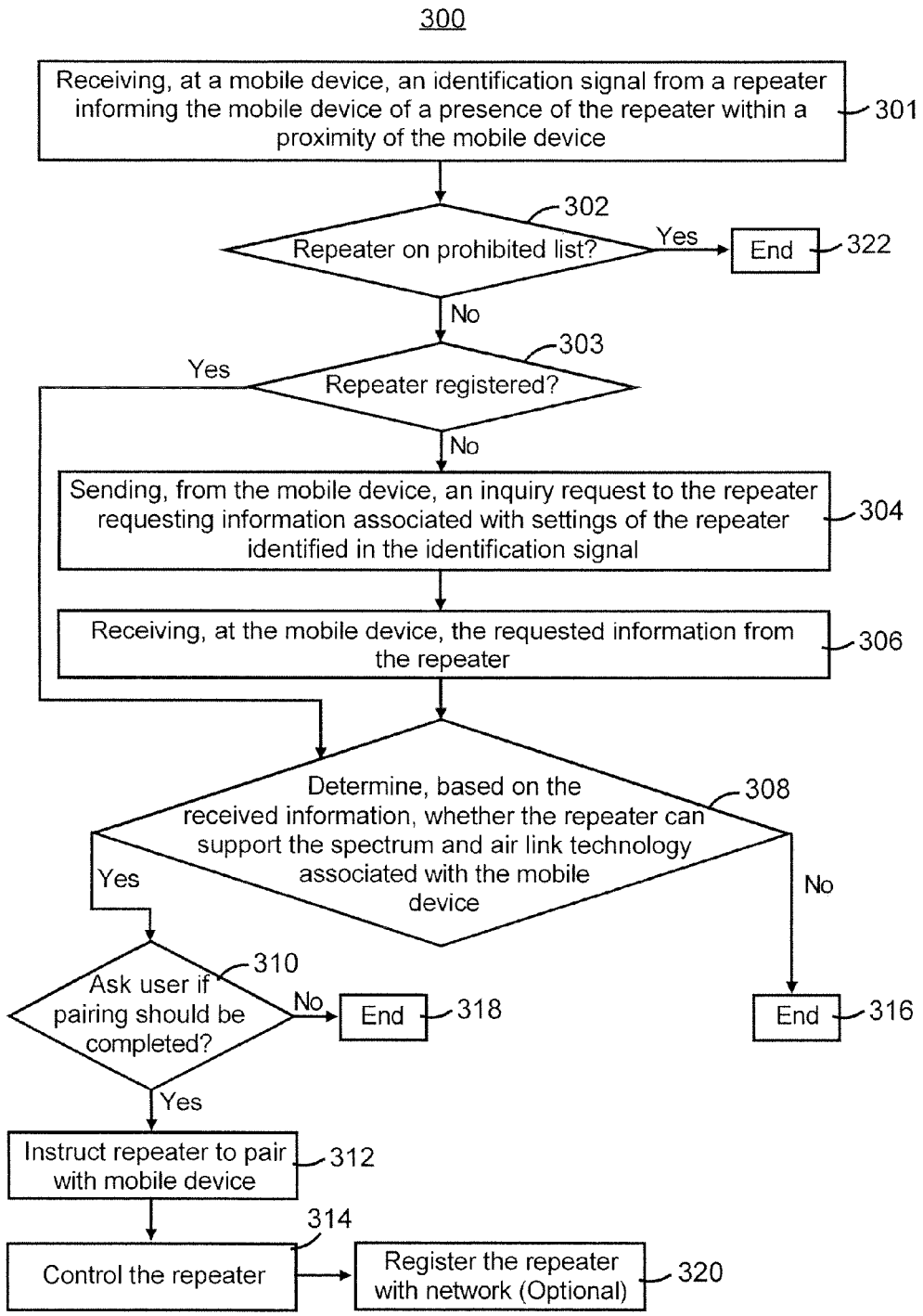
FIG. 3 illustrates an exemplary process used by a mobile device to control the operation of the repeater shown in the network of FIG. 1.

FIG. 3 illustrates an exemplary process 300 used by mobile device 105 to control the operation of the repeater 210. For process 300 to begin, it is assumed that the Bluetooth is enabled and operating in both the mobile device 105 and the repeater 210 begins with startup/discovery of the repeater 210. The repeater 210 makes its existence known by transmitting identification information. Specifically, in one implementation, the repeater 210 periodically transmits its repeater ID to the mobile device 105 until pairing is completed with the mobile device 105 and the Bluetooth link is established between them. The mobile device 105 receives the identification information from the repeater 210 (Step 301). The mobile device 105 checks to determine whether its repeater feature is enabled. If so, the mobile device 105 attempts to pair with the repeater 210. To this end, the mobile device 105 uses the repeater identification information to determine whether the repeater 210 is on a prohibited list of repeaters which should not be used for amplifying the signal (Step 302). If yes (Step 302, Yes), process 300 ends (Step 322). If not (Step 302, No), the mobile device 105 uses the repeater identification information to determine whether the repeater 210 was previously registered with the mobile device 105 (Step 303). If yes (Step 303, Yes), the process 300 proceed to Step 308 described further below. If not (Step 303, No), the process 300 proceed to Step 304.

In Step 304, the mobile device 105 responds to the repeater 210 by sending an inquiry request to the repeater 210 requesting information associated with the capabilities of the repeater 210. The information associated with the capabilities of the repeater 210 includes radio bands and radio technologies supported by the repeater 210. The information also includes model number of the repeater 210.

The mobile device 105 receives the requested information from the repeater (Step 306). Alternatively, the mobile device 105 may obtain the requested information from the device memory, which has stored the repeater's specifications during a previous pairing. In yet another alternative, the mobile device 105 may access this information from the Internet. Based on the received information, the mobile device 105 determines whether the repeater 210 can support the spectrum and air link technology associated with the mobile device (Step 308). If yes (Step 308, Yes), the mobile device 105 asks the user to indicate whether the pairing between the mobile device 105 and the repeater 210 should be completed (Step 310). If mobile device 105 determines that the user has confirmed, e.g. manually through a touchscreen of mobile device 105, that the pairing is to occur (Step 310, Yes), the mobile device 105 instructs the repeater 210 to pair with the mobile device 105 (Step 312). The pairing is performed using known technology such as, for example, Bluetooth technology. Once the pairing is completed, the Bluetooth communication link is established between the mobile device 105 and the repeater 210. The mobile device 105 utilizes the Bluetooth communication link to control the operation of the repeater 210 (Step 314). For example, the mobile device 105 can instruct the repeater 210 to turn ON and tune into a particular spectrum. In one implementation, the mobile device 105 automatically determines the spectrum band/block the mobile device 105 is operating on and informs the repeater 210 of the spectrum band/block that is being used. In response, the repeater 210 tunes into the identified spectrum band/block, from among a plurality of spectrum bands/blocks supported by the repeater, and amplifies signal on the identified spectrum band/block.

Before pairing is completed with the mobile device 105, the repeater 210 is programmed to remain OFF. While the repeater 210 is OFF, the repeater 210 can still perform its startup/discovery by transmitting identification signal to be paired with the mobile device 105. However, the repeater 210 cannot perform its intended amplification function for amplifying the signal. Once the pairing is completed, the repeater 210 waits for instruction to turn ON. Once turned ON, the repeater 210 can amplify the signal for successful call or data session.

If the mobile device 105 determines, based on the information received from the repeater 210, that the repeater 210 cannot support the spectrum and/or air link technology associated with the mobile device 105 (Step 308, No), the process 300 ends (Step 316). Similarly, if the mobile device 105 determines that the repeater 210 can support the spectrum and the air link technology associated with the mobile device 105 (Step 308, Yes) and further determines through user input that the user does not wish for the pairing to be completed (Step 310, No), the process 300 ends (Step 318). If the Bluetooth connection is broken, then pairing between the mobile device 105 and the repeater 210 is undone and the repeater is turned OFF. In one implementation, the repeater 210 turns OFF immediately after the Bluetooth connection is broken. In another implementation, the repeater 210 delays turn OFF for a short period of time to determine whether the Bluetooth connection will be reestablished. If the Bluetooth connection is not reestablished within the specified short period of time (to allow for accidental disconnection, e.g., <5-10 minutes), then the repeater 210 turns OFF. After pairing is completed, the mobile device 105 may optionally register the repeater 210 with the network 100 (Step 320).

Figure 4:
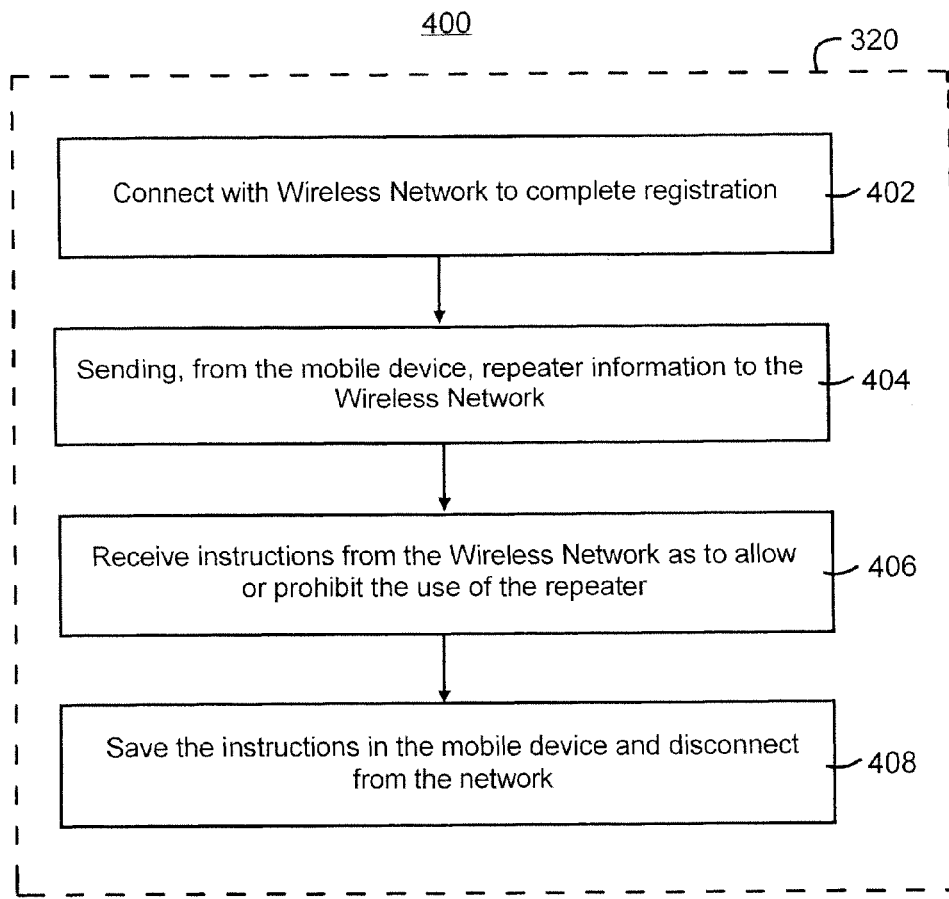
FIG. 4 illustrates an exemplary process for registering a repeater with the network of FIG. 1.

FIG. 4 illustrates an exemplary process 400 for registering the repeater 210 with the wireless network 100. In one implementation, the process 400 occurs at the time when the mobile device 105 and the repeater 210 are first paired and does not occur thereafter. Alternatively, the process 400 occurs each time the repeater is to be activated. The process 400 begins with the mobile device 105 connecting with the wireless network 100 to complete the registration (Step 402). The mobile device 105 sends the repeater information to the wireless network 100 (Step 404). The repeater information includes the repeater ID and the spectrum and the radio technology supported by the repeater 210. The wireless network 100 utilizes the received repeater information to determine whether the activation of the repeater 210 presents problem at the network level. For example, the network 100 determines whether enabling the repeater 210 would significantly detrimentally affect operation of a nearby base station because the repeater is not compatible and would cause interference. Based on the result of the determination, the network 100 sends the repeater status to the mobile device 105, either authorizing the activation of the repeater 210 or prohibiting the activation thereof.

The mobile device 105 receives the instructions from the network 100 (Step 406), saves the instructions in the mobile device 105, and disconnects from the network 100 (Step 408). If the instructions prohibit the activation of the repeater 210, the mobile device 105 deregisters the repeater 210 and ends the pairing with the repeater 210. To this end, if the repeater 210 was previously turned ON by the mobile device 105, the repeater 210 will turn OFF after the Bluetooth connection is broken. If, however, the instructions allow the activation of the repeater 210, the mobile device 105 maintains the pairing with the repeater 210 and saves the authorization information along with information the repeater 210 has provided.

If the Bluetooth connection between the mobile device 105 and the repeater 210 is lost after the registration is completed, the repeater 210 attempts to reconnect with the mobile device 105. As noted above, Bluetooth is enabled and operating in both the mobile device 105 and the repeater 210. The repeater 210 makes known to the mobile device 105 that it exists by transmitting identification information on the Bluetooth link. If so, the mobile device 105 attempts to pair with the repeater 210. To this end, the mobile device 105 receives the identification information from the repeater 210 (Step 301) and uses the repeater identification information to determine whether the repeater 210 is on a prohibited list of repeaters which should not be used for amplifying the signal (Step 302). If yes (Step 302, Yes), process 300 ends (Step 322). If not (Step 302, No), the mobile device 105 uses the repeater identification information to determine whether the repeater 210 was previously registered with the mobile device 105 (Step 303).

The mobile device 105 determines that the repeater 210 is present and already registered (Step 303, Yes). The mobile device determines based on the previously received information from the repeater 210 whether the repeater 210 can support the spectrum and air link technology associated with the mobile device (Step 308). If yes (Step 308, Yes), the mobile device 105 asks the user to indicate whether the pairing between the mobile device 105 and the repeater 210 should be completed (Step 310). If yes (Step 310, Yes), the mobile device 105 instructs the repeater 210 to pair with the mobile device 105 (Step 312). Once the pairing is completed, the Bluetooth communication link is again established between the mobile device 105 and the repeater 210. The mobile device 105 utilizes the Bluetooth communication link to control the operation of the repeater 210 (Step 314). In a slightly different implementation, after determining that the repeater 210 was previously registered at the mobile device 105 (Step 303, Yes), the mobile device 105 assumes that the repeater supports the spectrum and air link technology associated with the mobile device (Step 308, Yes) and also assumes the user wishes to pair the mobile device 105 with the repeater 210 (Step 310, Yes). Therefore, the process 300 skips to Step 312, where the mobile device 105 instructs the repeater 210 to pair with the mobile device 105 (Step 312). Once the pairing is completed, the Bluetooth communication link is again established between the mobile device 105 and the repeater 210. The mobile device 105 utilizes the Bluetooth communication link to control the operation of the repeater 210 (Step 314).

The repeater 210 waits for commands to set the spectrum band or block and to turn ON. If the Bluetooth connection is broken and the repeater 210 has been turned ON, then the pairing is undone and the repeater 210 automatically shuts off. Specifically, the repeater 210 can be programmed to remain off during the time it is not paired with the mobile device 105. However, as noted above, the Bluetooth in the repeater 210 is still enabled and operating to allow discovery and pairing to take place.

Figure 5:
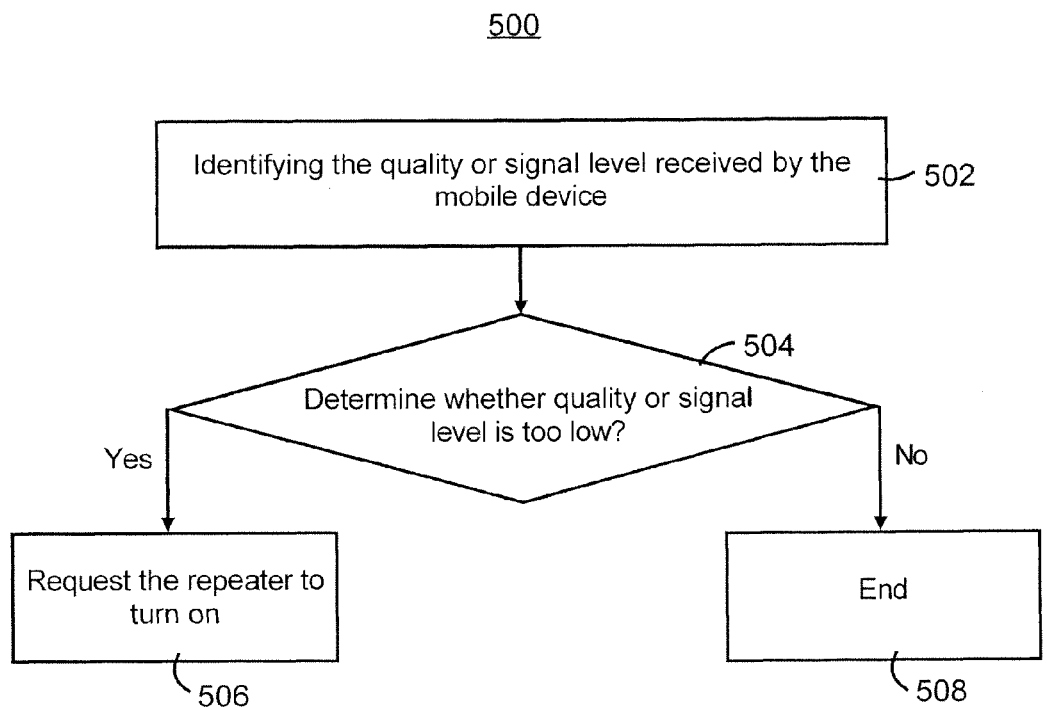
FIG. 5 illustrates an exemplary process used by a mobile device to turn ON the repeater shown in the network of FIG. 1.

FIG. 5 illustrates an exemplary process 500 used by the mobile device 105 to turn ON the repeater. Here, it is assumed that the repeater 210 and the mobile device 105 are already paired. The process 500 begins with the mobile device 105 identifying the quality or signal level the mobile device 105 receives from network 100 (Step 502). The mobile device 105 then determines whether the quality or signal level is too low for effective communication with the network 100 (Step 504). This may happen if the desired signals are too far below the noise level even with digital processing gain; in the presence of interfering RF signals or other emissions (such as intermodulation); in the presence of undesired signals strong enough to overload/desensitize the desired radio receiver; or due to signal phase errors or impairments that might be caused by an inadequate RF repeater or booster product when incorrectly used in the presence of certain technologies If so (Step 504, Yes), the mobile device 105 instructs the repeater 210 to turn ON (Step 506). To this end, the mobile device 105 may also instruct the repeater 210 to amplify a specific spectrum band/block that is being utilized by the mobile device 105 from among a plurality of spectrum bands/blocks supported by the repeater. In a slightly different implementation, if approval of the network 100 is required to turn ON the repeater 210, the mobile device 105 determines whether such approval has been obtained. The mobile device 105 may have previously sought this approval when the mobile device 105 optionally registered the repeater 210 with the network 100 as shown above with respect to FIG. 4. If no approval has been obtained, the mobile device 105 seeks the approval of the network 100 before instructing the repeater 210 to turn ON. If the mobile device 105 determines that the quality or signal level is not too low (Step 504, No), the process 500 ends (Step 508) and the repeater 210 remains OFF.

The repeater 210 waits until it receives commands to turn ON and to adjust its spectrum bands/blocks if this functionality is available on the repeater 210. Specifically, repeater 210 may be programmed to amplify a plurality of spectrum bands/blocks without having the capability to tune into a specific spectrum band/block, from among the plurality of spectrum bands/blocks supported by the repeater, and amplify the specific spectrum band/block. Alternatively, the repeater 210 may have the capability to tune into a specific spectrum band/block, from among the plurality of spectrum bands/blocks supported by the repeater, and amplify the specific spectrum band/block.

In either case, if the above conditions for turning the repeater 210 ON are met, so that the repeater 210 is instructed to turn ON, the repeater 210 turns ON and reports to the mobile device 105 that it is now active. After turn on, the repeater 210 may be configured to evaluate and quickly react to the ambient RF signal-level environment and even shut itself down such as to prevent self-oscillation in the extreme case. To this end, the repeater 210 may be configured to identify the signal level of another nearby base station serving another mobile device and determine that operation of the repeater 210 while ON would affect the operation of the other base station. If so, the repeater 210 may turn OFF after subsequently being turned ON and may inform the mobile device 105 of the same. For example, the repeater 210 sends status information to the mobile device 105, indicating the repeater 210 has turned OFF. Similarly, after the repeater 210 turns ON, the repeater 210 may detect that the signal quality and/or signal level the serving cell signal has become strong, the repeater 210 then may turn OFF and send a message to the mobile device 105 indicating that the repeater 210 has turned OFF (and perhaps the reason why so that the mobile device 105 does not again attempt to activate the repeater 210).

In a slightly different implementation, after instructing the repeater 210 to turn ON, the mobile device 105 may periodically instruct the repeater 210 to turn OFF to monitor the signal quality and/or signal level of the mobile device 105 without the use of the repeater 210. If the mobile device 105 determines that the signal quality and/or signal level has reached above a threshold level, the mobile device 105 instructs the repeater 210 to remain OFF.

If after the repeater 210 turns ON, the Bluetooth connection is lost, the repeater 210 automatically turns OFF. When the mobile device 105 detects that the Bluetooth connection is lost, the mobile device 105 assumes that the repeater 210 is OFF and no longer paired. Therefore, when Bluetooth connection is reestablished, the mobile device 105 reinitiates pairing with the repeater 210.

Some repeaters amplify per spectrum block and others per spectrum band. The spectrum block is spectrum per licensee; whereas, the spectrum band is a frequency band (e.g., cellular, PCS, etc.). When the mobile device 105 and the repeater 210 are paired and the repeater 210 is ON and the mobile device 105 is in a call or data session, it is possible for the Wireless Service to change. For example, the Wireless Service can switch from one spectrum band to another spectrum band or from one spectrum block to another spectrum block. This occurs as the mobile device is moving from one licensed territory to another. The mobile device 105 recognizes this change and is able to instruct the repeater 210 to change its amplification so as to amplify the new spectrum band/block and to stop amplifying the old spectrum band/block.

Figure 6:
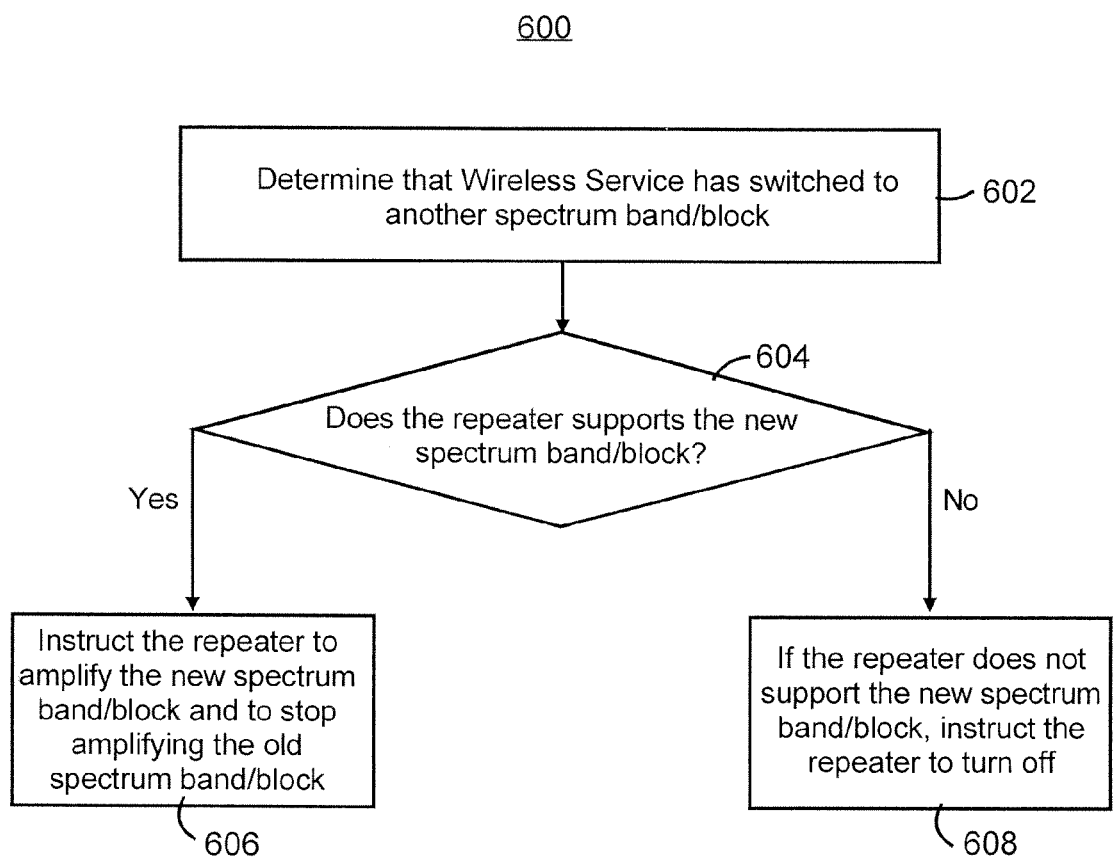
FIG. 6 illustrates an exemplary process used by a mobile device to change an amplification band/block of the repeater shown in the network of FIG. 1.

FIG. 6 illustrates an exemplary process 600 used by the mobile device 105 to change the amplification band/block of the repeater 210. Here, it is assumed that the repeater 210 and the mobile device 150 are paired and that the repeater 210 is ON and the mobile device is in a call or data session. The process 600 begins with the mobile device 105 determining that the Wireless Service has switched to another spectrum band/block (Step 602). The mobile device 105 determines whether the repeater 210 supports the new spectrum band/block in the same manner as specified above (Step 604). If yes (Step 604, Yes), the mobile device 105 instructs the repeater 210 to amplify the new spectrum band/block and to stop amplifying the old spectrum band/block (Step 606). If the repeater does not support the new spectrum band/block (Step 604, No), the mobile device 105 instructs the repeater 210 to turn OFF (Step 608).

Those skilled in the art presumably are familiar with the structure, programming and operations of the various types of mobile devices. However, for completeness, it may be useful to consider the functional elements/aspects of an exemplary mobile device 105, at a high-level.

Figure 7:
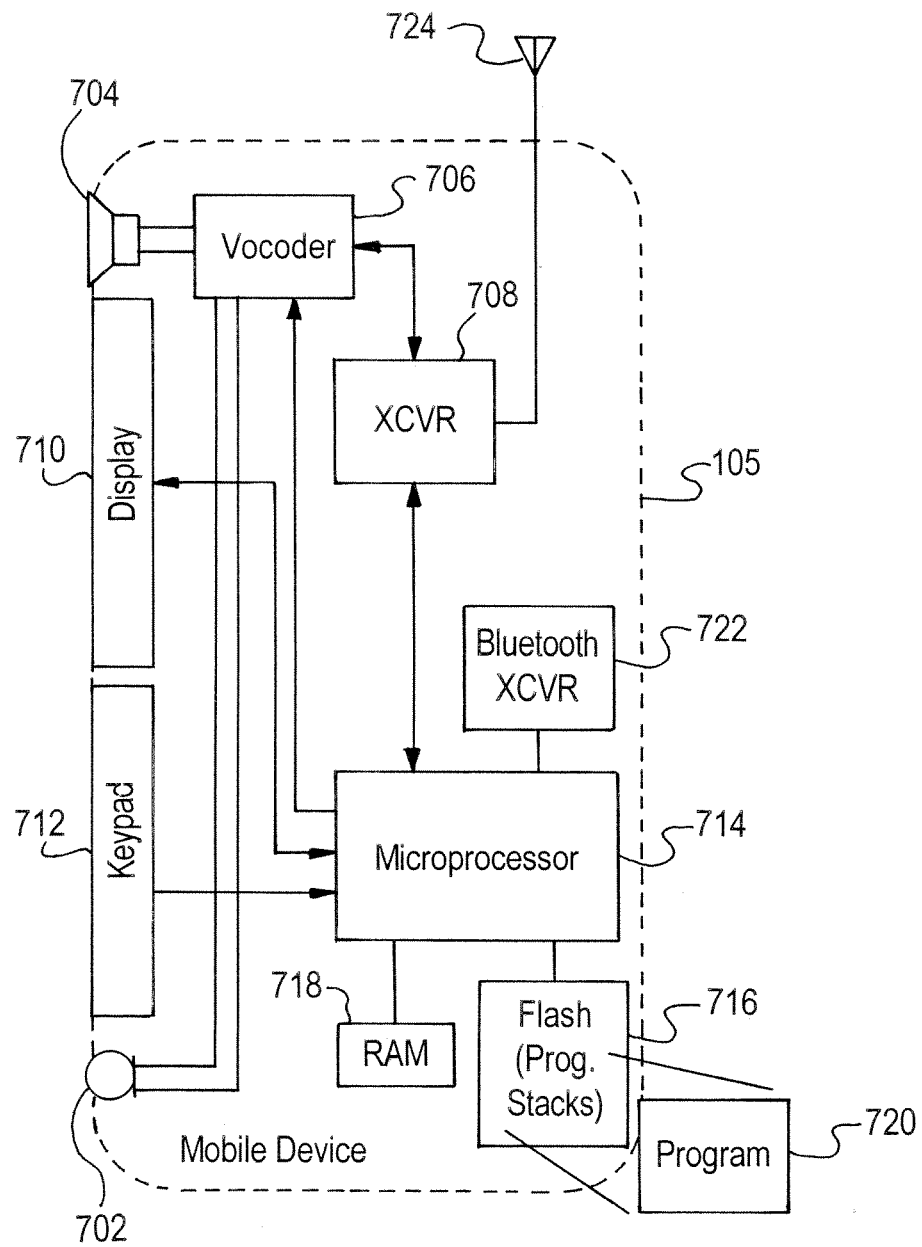
FIG. 7 is a high-level functional block diagram of a mobile device as may communicate through a network/system like that shown in FIGS. 1 and 2, to control the operation of repeater in the manner represented by the process flow of FIG. 3.

FIG. 7 is a high-level functional block diagram of a mobile device as may communicate through a network/system like that shown in FIGS. 1 and 2, to control the operation of the repeater 210 in the manner represented by the process flow of FIG. 3. Although the mobile device 105 may be a smartphone or may be incorporated into another device, such as a portable personal computer, personal digital assistant (PDA) or the like, for discussion purposes, the illustration shows the mobile device 105 in the form of a handset. The handset embodiment of the mobile device 105 functions as a normal digital wireless telephone station. For that function, the mobile device 105 includes a microphone 702 for audio signal input and a speaker 704 for audio signal output. The microphone 702 and speaker 704 connect to voice coding and decoding circuitry (vocoder) 706. For a voice telephone call, for example, the vocoder 706 provides two-way conversion between analog audio signals representing speech or other audio and digital samples at a compressed bit rate compatible with the digital protocol of wireless telephone network communications or voice over packet (Internet Protocol) communications.

For digital wireless communications, the mobile device 105 also includes at least one digital transceiver (XCVR) 708 for calls through a mobile communication network and for determining location of the mobile device. The XCVR 708 supports a plurality of wireless access technologies. Specifically, the XCVR 708 is configured to support communication with 1xRTT RAN, LTE RAN, and EvDO RAN. The mobile device 105 is a multimode device capable of operations on various technology type networks. For example, the mobile device 105 may utilize either or both of 3GPP2 (1XRTT and EvDO) technologies and 3GPP (LTE/GSM/UMTS) technologies. For that purpose, the XCVR 708 could be a multimode transceiver, or the mobile device 105 may include two or more transceivers each of which supports a subset of the various technologies or modes. The concepts discussed here encompass embodiments of the mobile device 105 utilizing any digital transceivers that conform to current or future developed digital wireless communication standards.

The XCVR 708 provides two-way wireless communication of information, such as vocoded speech samples and/or digital message information, in a selected one of the technology modes. The XCVR 708 also sends and receives a variety of signaling messages in support of the various voice and data services provided via the mobile device 105 and the communication network (described earlier with regard to FIG. 2). Each XCVR 708 connects through RF send and receive amplifiers (not separately shown) to an antenna 724. In the example, the XCVR 708 is configured for RF communication in accord with a digital wireless protocol, such as the current 3GPP2 and 3GPP protocols.

The mobile device 105 includes a display 710 for displaying messages, menus or the like, call related information dialed by the user, calling party numbers, etc. A keypad 712 enables dialing digits for voice and/or data calls as well as generating selection inputs, for example, as may be keyed-in by the user based on a displayed menu or as a cursor control and selection of a highlighted item on a displayed screen. The display 710 and keypad 712 are the physical elements providing a textual or graphical user interface. In addition to normal telephone and data communication related input/output, these elements also may be used for display of menus and other information to the user and user input of selections. Various combinations of the keypad 712, display 710, microphone 702 and speaker 704 may be used as the physical input output elements of the GUI, for multimedia (e.g. audio and/or video) communications. Of course other user interface elements may be used, such as a stylus and touch sensitive display screen, as in a PDA or smart phone.

A microprocessor 714 serves as a programmable controller for the mobile device 105, in that it controls all operations of the mobile device 105 in accordance with programming that it executes, including operations for controlling the repeater 210. Specifically, the microprocessor 714 is configured to execute processes 300-600 shown in FIGS. 3-6 for controlling operation of repeater 210 and thereby enhance connectivity of the mobile device 105 to the wireless network 100.

The mobile device 105 includes flash type program memory 716, for storage of various "software" or "firmware" program routines and mobile configuration settings, such as mobile directory number (MDN) and/or mobile identification number (MIN), etc. The mobile device 105 also includes a non-volatile random access memory (RAM) 718 for a working data processing memory. Of course, other storage devices or configurations may be added to or substituted for those in the example. In a present implementation, the flash type program memory 716 stores firmware such as a boot routine, device driver software, an operating system, call processing software and vocoder control software, and any of a wide variety of other applications, such as client browser software and short message service software. The memories 716, 718 also store various data, such as telephone numbers and server addresses, downloaded data such as multimedia content, and various data input by the user.

Programming for the mobile device 105 includes programming 720 for controlling the operation of repeater 210. The programming 720 may be stored in the memories 716 and/or 718. The mobile device 105 also includes a Bluetooth transceiver 722. The Bluetooth transceiver 722 is used for establishing a Bluetooth link with the repeater 210.

The structure and operation of the mobile device 105, as outlined above, were described to by way of example, only.

As shown by the above discussion, functions relating to programming in storage accessible to the processor for controlling the repeater from the mobile device may be implemented by programming on the mobile device. In addition to memory or the like in the mobile device, the relevant programming may be stored at times in a general purpose computer, e.g., for loading into the mobile device.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for controlling the operation of the repeater. The software code is executable by processor(s) of the mobile terminal device. In operation, the code is stored within the general-purpose computer platform. At other times, however, the software may be stored at other locations and/or transported for loading into the appropriate mobile device. Execution of such code by a processor of the mobile device enables the station to implement the methodology for wirelessly connecting to the repeater via a wireless link (e.g., Bluetooth link) and controlling the operation of the repeater, in essentially the manner performed in the implementations discussed and illustrated herein.

Figure 8:
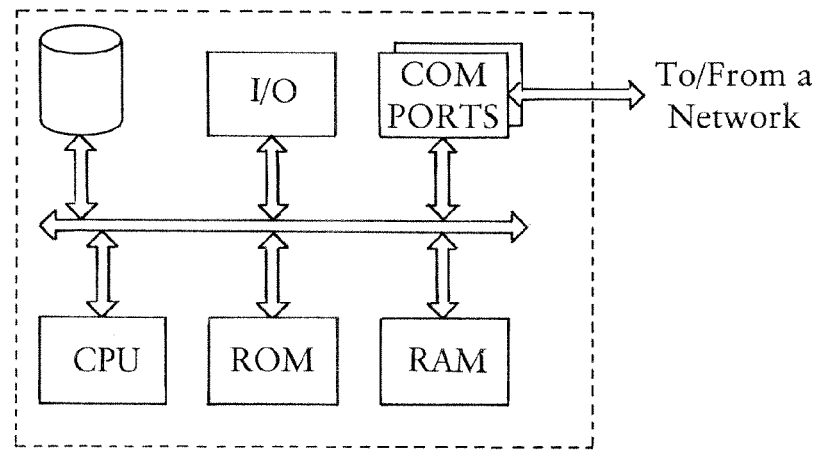
FIG. 8 is a simplified functional block diagram of a computer that may be configured as a host or server, for example, to function as a management server for downloading programming to a mobile device like that of FIGS. 1 and 2.
Figure 9:
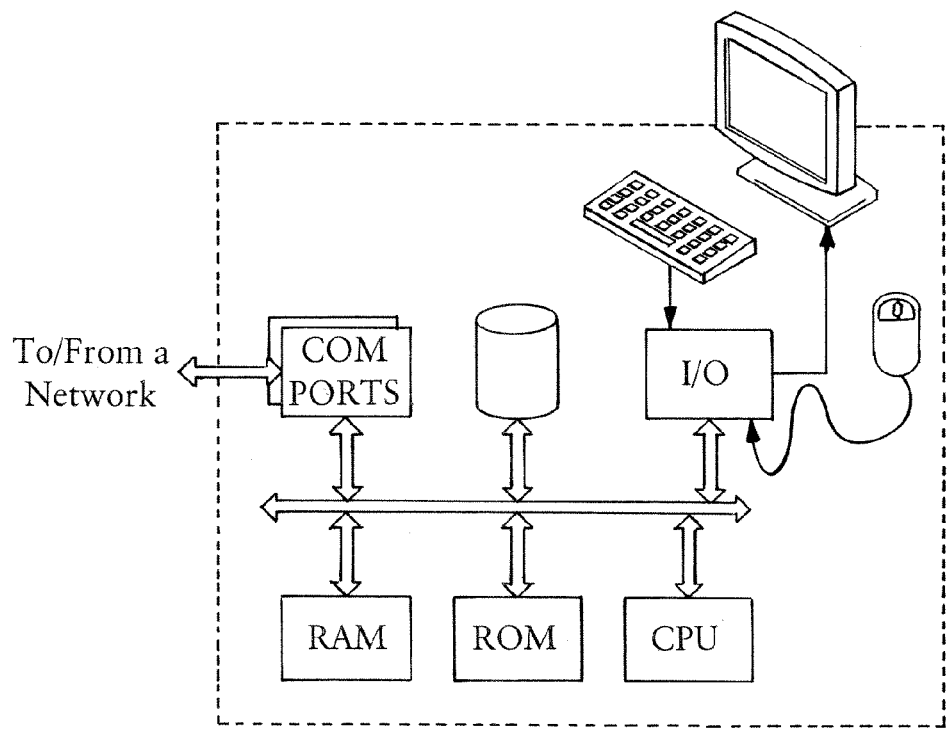
FIG. 9 is a simplified functional block diagram of a personal computer or other work station or terminal device.

FIG. 8 is a simplified functional block diagram of a computer that may be configured as a host or server, for example, to function as a management server for downloading programming to a mobile device like that of FIGS. 1 and 2. FIG. 9 is a simplified functional block diagram of a personal computer or other work station or terminal device. These general purpose platforms also may be used to load programming into the mobile device. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the methods for controlling the operation of the repeater outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the mobile device, computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile service provide into the mobile device. For such communications, software elements may be carried as part of optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium or physical transmission medium. Non-volatile storage media include, for example, optical or magnetic disks, such as any of the storage devices in any computer(s) or the like, such as may be used to implement the aforementioned technology shown in the drawings. Volatile storage media include dynamic memory, such as main memory of such a computer platform. Tangible transmission media include coaxial cables; copper wire and fiber optics, including the wires that comprise a bus within a computer system. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

For example, the mobile device may include a repeater feature which can be enabled or disabled. If enabled, the mobile device establishes a communication with the nearby repeater and controls the operation of the repeater. If disabled, the mobile device does not establish a communication with the repeater and naturally does not control the operation of the repeater. The repeater feature can be turned ON/OFF by the user or the wireless carrier. For example, the wireless carier can send over the air instructions to the mobile device to enable or disable the repeater feature on the mobile device and also to install a "Prohibited" status for a particular repeater. This method allows for interference control and also allows for disabling defective repeater amplifiers or obsolete repeaters.

To disable the repeater, the wireless carrier requests that the mobile device turns OFF its repeater feature. In response, the mobile device turns OFF its repeater feature and the mobile device confirms the same to the wireless network. Turning OFF the repeater feature, results in the mobile device not establishing a communication link with the repeater. Similarly, to enable the repeater, the wireless network can request that the mobile device turn ON its repeater feature. In response, the mobile device turns ON its repeater feature and the mobile device confirms the same to the wireless network.

For another example, the wireless carrier can request the mobile device to report repeater make/model and other information associated with the repeater in communication with the mobile device. The wireless carier can command the mobile device to unregister a repeater based on the make/model of the repeater. The wireless carrier can also install on the mobile device "prohibited" status for a particular make/model of repeater. This prevents the mobile device to connect to the repeater having the same make/model as the repeater having the "prohibited" status. The wireless carrier can also instruct the mobile device to remove "prohibited" status for the particular make/model of repeater. Other implementations are contemplated.

For another example, instead of the of mobile device determining whether the repeater is capable of supporting the mobile device, the repeater performs this task. To this end, the repeater obtains information from the mobile device and identifies the supported radio band and radio technology of the mobile device. Then, the repeater determines whether the repeater supports the identified radio band and radio technology of the mobile device and informs the mobile device of the same. If so, the mobile device controls the operation of the repeater. If not, the mobile device does not control the operation of the repeater and the repeater does not turn ON or turns OFF if it was previously turned ON.

For another example, the repeater may be configured to simultaneously amplify multiple spectrum bands and/or blocks upon determination that the mobile device is operating in the multiple spectrum bands and/or blocks. Specifically, the mobile device may instruct the repeater to tune into multiple spectrum bands and/or blocks in which the mobile device is operating and to amplify those spectrum bands and/or blocks from among a plurality of spectrum bands and/or blocks supported by the repeater.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   receiving, at a mobile device, an identification signal from a repeater informing the mobile device of a presence of the repeater within a proximity of the mobile device;
   sending, from the mobile device, an inquiry request to the repeater requesting information associated with capabilities of the repeater identified in the identification signal;

receiving, at the mobile device, the requested information from the repeater;
determining, at the mobile device based on the received information, whether to use the repeater for communication between the mobile device and a mobile communication network;
controlling, by the mobile device, the repeater based on the determination result; and
instructing, by the mobile device, the repeater to tune to a spectrum band/block from a plurality of spectrum bands/blocks supported by the repeater to amplify the spectrum band/block when the mobile device switches to the spectrum band/block.

2. The method of claim 1, further comprising:
establishing a first communication link between the mobile device and the repeater for controlling the repeater; and
after establishing the first communication link, establishing a second communication link between the mobile device and the repeater for communication between the mobile device and the mobile communication network via the repeater, the first and second communication links using different technologies.

3. The method of claim 2, wherein:
the first communication link includes a Bluetooth communication link, and
the second communication link includes a cellular communication link.

4. The method of claim 1, wherein the information associated with the capabilities of the repeater includes a radio band and a radio technology supported by the repeater.

5. The method of claim 4, wherein determining whether to use the repeater includes determining, at the mobile device, whether the radio band and the radio technology supported by the repeater are compatible with a radio band and a radio technology supported by the mobile device.

6. The method of claim 4, wherein:
determining whether to use the repeater includes determining, at the mobile device, whether the mobile device is receiving a signal of sufficient signal level or quality from the mobile communication network without use of the repeater, and
controlling the repeater includes instructing the repeater to turn ON upon determining that the mobile device is not receiving a signal of sufficient signal level or quality from the mobile communication link.

7. The method of claim 1, wherein determining whether to use the repeater includes determining, at the mobile device, whether use of the repeater for communications between the mobile device and the mobile communication network would significantly detrimentally affect operation of a nearby base station other than a base station serving the mobile device.

8. The method of claim 7, further comprising determining a signal level of the nearby base station, and wherein determining whether use of the repeater would significantly detrimentally affection operation of the nearby base station is based on the signal level.

9. The method of claim 1, further comprising:
establishing communication with the mobile communication network;
sending the identification signal to the mobile communication network; and
receiving instructions from the mobile communication network as to allow or prohibit the use of the repeater based on the forwarded identification signal,
wherein controlling the repeater includes controlling the repeater based on the received instructions from the mobile communication network.

10. The method of claim 1, wherein instructing the repeater includes instructing the repeater to turn ON and to amplify only the spectrum band/block to which the mobile device switches.

11. The method of claim 1, wherein controlling the repeater includes turning ON the repeater, which was OFF, upon determining that the repeater should be used for communication between the mobile device and the mobile communication network.

12. The method of claim 11, further comprising:
determining that the mobile device has changed a spectrum band and/or block of operation; and
upon determining that the mobile device has changed the spectrum band and/or block of operation, determining whether the changed spectrum band and/or block is compatible with one of a plurality spectrum bands and/or blocks supported by the repeater,
wherein controlling the repeater further includes turning OFF the repeater, after previously having turned ON the repeater, upon determining that the changed spectrum band and/or block is not compatible with the spectrum bands and/or blocks supported by the repeater.

13. The method of claim 11, further comprising:
determining that the mobile device has changed a spectrum band and/or block of operation; and
upon determining that the mobile device has changed the spectrum band and/or block of operation, determining whether the changed spectrum band and/or block is compatible with one of a plurality spectrum bands and/or blocks supported by the repeater;
wherein controlling the repeater further includes instructing the repeater to not amplify previously amplified spectrum band and/or block, to tune into the changed spectrum band and/or block, and to amplify the changed spectrum band and/or block upon determining that the changed spectrum band and/or block is compatible with one of the plurality of spectrum bands and/or blocks supported by the repeater.

14. The method of claim 1, wherein controlling the repeater includes tuning OFF the repeater, which was ON, upon determining that the repeater should not be used for communication between the mobile device and the mobile communication network.

15. The method of claim 1, further comprising:
requesting authorization from a user of the mobile device to use the repeater for communication between the mobile device and the mobile communication network;
wherein controlling the repeater includes instructing the repeater to turn ON after receiving authorization from the user to use the repeater for communication between the mobile device and the mobile communication network.

16. A mobile device, comprising:
a processor; and
a memory storing executable instructions for causing the processor to:
receive, at a mobile device, an identification signal form a repeater informing the mobile device of a presence of the repeater within a proximity of the mobile device;
send, from the mobile device, an inquiry request to the repeater requesting information associated with capabilities of the repeater identified in the identification signal;
receive the requested information from the repeater;

determine, based on the received information, whether to use the repeater for communication between the mobile device and a mobile communication network;
control the repeater based on the determination result; and
instruct the repeater to tune to a spectrum band/block from a plurality of spectrum bands/blocks supported by the repeater to amplify the spectrum band/block when the mobile device switches to the spectrum band/block.

17. The mobile device of claim 16, wherein the memory further stores executable instructions for causing the processor to:
establish a first communication link between the mobile device and the repeater for controlling the repeater; and
after establishing the first communication link, establish a second communication link between the mobile device and the repeater for communication between the mobile device and the mobile communication network via the repeater, the first and second communication links using different technologies.

18. The method of claim 17, wherein:
the first communication link includes a Bluetooth communication link; and
the second communication link includes a cellular communication link.

19. The mobile device of claim 16, wherein the information associated with the capabilities of the repeater includes a radio band and a radio technology supported by the repeater.

20. The mobile device of claim 19, wherein to determine whether to use the repeater, the memory further stores executable instructions for causing the processor to determine whether the radio band and the radio technology supported by the repeater are compatible with a radio band and a radio technology supported by the mobile device.

21. The mobile device of claim 19, wherein to:
determine whether to use the repeater, the memory further stores executable instructions for causing the processor to determine whether the mobile device is receiving a signal of sufficient signal level or quality from the mobile communication network without the use of the repeater, and
control the repeater, the memory further stores executable instructions for causing the processor to instruct the repeater to turn ON upon determining that the mobile device is not receiving a signal of sufficient signal level or quality from the mobile communication network.

22. A method comprising:
receiving, at a mobile device, an identification signal from a repeater informing the mobile device of a presence of the repeater within a proximity of the mobile device;
sending, from the mobile device, an inquiry request to the repeater requesting information associated with capabilities of the repeater identified in the identification signal;
receiving, at the mobile device, the requested information from the repeater;
determining, based on the received information, whether to use the repeater for communication between the mobile device and a mobile communication network;
controlling, by the mobile device, the repeater based on the determination result, wherein controlling the repeater includes turning ON the repeater, which was OFF, upon determining that the repeater should be used for communication between the mobile device and the mobile communication network;
determining that the mobile device has changed a spectrum band and/or block of operation; and
upon determining that the mobile device has changed the spectrum band and/or block of operation, determining whether the changed spectrum band and/or block is compatible with one of a plurality spectrum bands and/or blocks supported by the repeater,
wherein controlling the repeater further includes turning OFF the repeater at least one of:
after previously having turned ON the repeater, upon determining that the changed spectrum band and/or block is not compatible with the spectrum bands and/or blocks supported by the repeater, or
instructing the repeater to not amplify a previously amplified spectrum band and/or block, to tune into the changed spectrum band and/or block, and to amplify the changed spectrum band and/or block upon determining that the changed spectrum band and/or block is compatible with one of the plurality of spectrum bands and/or blocks supported by the repeater.

* * * * *